United States Patent
Comacchio et al.

(10) Patent No.: US 8,083,009 B2
(45) Date of Patent: Dec. 27, 2011

(54) WELL DRILLING MACHINE WITH NEW DRILL PIPE LOADER

(76) Inventors: Renzo Comacchio, Riese Pio X (IT); Pasqualino Comacchio, Riese Pio X (IT); Patrizio Comacchio, Riese Pio X (IT)

( * ) Notice: Subject to any disclaimer, the term of this patent is extended or adjusted under 35 U.S.C. 154(b) by 316 days.

(21) Appl. No.: 12/094,987

(22) PCT Filed: Nov. 13, 2006

(86) PCT No.: PCT/IT2006/000791
§ 371 (c)(1), (2), (4) Date: Nov. 4, 2008

(87) PCT Pub. No.: WO2007/063568
PCT Pub. Date: Jun. 7, 2007

(65) Prior Publication Data
US 2009/0114446 A1 May 7, 2009

(30) Foreign Application Priority Data
Nov. 30, 2005 (IT) .............................. PD2005A0350

(51) Int. Cl.
*E21B 19/14* (2006.01)
(52) U.S. Cl. .......................... 175/52; 175/85; 414/22.58
(58) Field of Classification Search .................. 175/52, 175/85; 414/22.52, 22.22, 22.58
See application file for complete search history.

(56) References Cited

U.S. PATENT DOCUMENTS

| | | | | |
|---|---|---|---|---|
| 4,024,925 A | * | 5/1977 | Brown | 175/85 |
| 4,368,602 A | | 1/1983 | Manten | |
| 4,547,110 A | | 10/1985 | Davidson | |
| 4,604,724 A | | 8/1986 | Shaginian | |
| 4,708,581 A | | 11/1987 | Adair | |
| 6,179,065 B1 | | 1/2001 | Payne et al. | |
| 6,298,927 B1 | * | 10/2001 | Back | 175/52 |
| 6,860,694 B2 | * | 3/2005 | Slettedal | 414/22.51 |
| 2005/0269133 A1 | * | 12/2005 | Little | 175/52 |

FOREIGN PATENT DOCUMENTS

| | | |
|---|---|---|
| WO | 9626349 | 8/1996 |
| WO | 0055470 | 9/2000 |

* cited by examiner

*Primary Examiner* — David Andrews
(74) *Attorney, Agent, or Firm* — Themis Law

(57) ABSTRACT

The invention is a new well drilling machine, in particular for drilling with single pipes, with supporting mast (M) provided with at least one drill head' (R) for the rotation-translation movement of the drill pipe (A), a loader (C) for said pipes (A), hinged to the relative supporting frame (T), integral with the machine body, and wherein said loader (C) can be slanted from the non-operating position (1) to the operating position (2), in which said pipes (A) are further slanted with respect to ground level, and vice versa. The loader (C) comprises sliders (J, K) which run on parallel guides (S) and on which said pipes (A) rest transversally, wherein two or more long pins or bars (P) square to and integral with said sliders (J, .K) are positioned between adjacent pipes (A), and wherein the running of said sliders (J, K) causes the translation of said bars (P) and said pipes (A).

7 Claims, 3 Drawing Sheets

WELL DRILLING MACHINE WITH NEW DRILL PIPE LOADER

The present patent relates to drilling machines, particularly for geothermal energy plants, and in particular concerns a well drilling machine with a new drill pipe loader that can be slanted.

Geothermal energy plants which exploit the endogenous heat of the planet are increasingly used. Said endogenous heat, in addition to being absorbed by the ground, is also absorbed by the water in the underground strata and can therefore be exploited in geothermal energy plants.

The known geothermal energy plants, with both high and low enthalpy, require one or more geothermal probes, inserted deep in the ground for the exchange of heat and connected to a tank or external user such as a turbine or heat pump.

Said geothermal energy plants, used in particular for heating civil or industrial buildings, are generally installed in buildings and in residential areas and the drilling operations must be performed in the surrounding courtyards.

The exchange of heat with the ground and/or with the groundwater therefore takes place by means of said geothermal uptake probes which are placed inside wells specifically provided for this purpose and having a diameter of approximately 10 cm.

The known geothermal uptake probes consist of a pair of tubes, one delivery and one return, preferably joined to form a closed U-shaped circuit.

The number of geothermal energy plants produced is on the increase, and in some countries they are even preferred to the ordinary methane or oil heating plants.

One of the factors that prevent large-scale use of plants of this type is the high cost of drilling operations and in particular the cost of drilling equipment and labour.

For the creation of said wells for insertion of the uptake probes, drilling machines are used, provided with drilling tool connected to the machine body by means of an appropriate drill column.

Drilling tools for rocky ground are known.

Said drill column is hollow and consists of various segments or hollow tubular pipes joined by threading so that they can be screw-connected to each other.

The segments or pipes that make up said drill column each have a length in the order of 3-4 meters and are progressively screw-tightened to one another as the drilling goes deeper.

Initially the drilling tool is connected to the machine body by means of the first drill pipe segment.

The drilling machine performs the drilling by giving said drill column, and therefore also the drilling tool, a rotation-translation movement towards the ground.

When the well bored has such a depth that said drilling battery is inserted almost completely in the ground, the drilling is interrupted and another pipe must be screw-connected to continue with the drilling.

This operation is repeated until the drilling tool reaches the optimal stratum, i.e. until the well bored reaches the required depth.

The drill pipe assembly operation is performed manually by one or more operators or, more often, by means of specific automatic loading devices.

Some known drilling machines are provided with specific pipe loaders, with mechanical arm systems which grip the pipe and align it with the pipe already inserted in the ground.

The upper end of the pipe is coupled to the rotating head of the drilling machine and is screw-connected to the pipe already inserted in the ground in such a way as to be integral with it; the drilling operation can now continue.

The known loaders are integral with the machine body and have the function of containing the drill pipes, placing them one by one in the withdrawal position, where they are gripped and withdrawn by the mechanical arm.

Gravity loaders are known inside which said pipes are arranged horizontally.

The mechanical arm grips the pipe that is in the lowest position inside the loader, withdraws it and aligns it with the pipe already inserted in the ground.

Inside the loader, the withdrawal position is immediately occupied by another pipe, ready for subsequent use.

The pipe is moved inside the tilting loader substantially by gravity, with the serious drawbacks of producing very loud noise and resulting in inaccurate positioning of the pipe.

Revolver loaders are also known, substantially comprising a central vertical rotating shaft, where the pipes are arranged around said shaft and parallel to it.

Here again, the mechanical arm withdraws the drill pipe from a pre-defined withdrawal position.

After withdrawal of the pipe, the revolver loader rotates around its shaft, placing another pipe in the withdrawal position.

The revolver loaders are very slow in the maneuvering operations and their construction structure necessarily requires them to be fitted on the front part of the drill mast, thus creating a considerable weight on the front of the machine, which can become unstable.

The subject of the present invention is a well drilling machine, particularly for geothermal energy plants, with a new loader for single drill pipes.

The main purpose of the present invention is to make wells for the insertion of geothermal uptake probes, particularly in ground where drilling is performed by drilling systems that use single drill pipes.

A further object of the present invention is to automate the pipe loading process.

A further object of the present invention is to automate repositioning of the drill pipes extracted from the ground inside the loader.

A further object of the present invention is to reduce sound emissions and, therefore, noise pollution produced during drilling of the wells.

A further object of the present invention is to perform both vertical and slanting drilling operations.

One of the advantages of the present invention lies in that it can also be used in limited spaces, since it has a compact shape and reduced dimensions.

A further advantage of the present invention lies in that it requires the presence of one single operator, reducing labour costs.

Last but not least, a further advantage of the present invention lies in that it reduces the time required for positioning the drill pipes and therefore for performing the drilling.

These and other direct and complementary aims are achieved by the new well drilling machine, particularly for the construction of geothermal energy plants on rocky ground, with a new low-noise drill pipe loader that can be slanted.

The new drilling machine consists in its main parts of a compact machine body, with tracked wheels and provided with mast for supporting and positioning the drill pipe, specific rotation devices which give said pipe the rotation-translation movement towards the ground and at least one loader for the drill pipes.

Said loader is hinged to a supporting frame integral with the machine body and arranged with base or lower supporting grille in a substantially horizontal position or slightly slanting with respect to the ground when not in use.

The drill pipes contained in said loader are arranged parallel to said base or lower supporting grille.

The new automatic loader can be further slanted, i.e. it can be moved from the position it assumes when not in use to a slanting position with respect to the ground when it is prepared for operation.

The new drilling machine also comprises one or more mobile mechanical arms which withdraw the pipe from a pre-set withdrawal position inside the loader and position it at the level of the rotating drill head.

The upper end of the pipe is screw-connected to the threaded fitting of the rotating drill head in order to proceed with drilling.

The new loader comprises specific devices suitable for translating the pipes and placing them in the withdrawal position, from which they can be withdrawn by the mechanical arm.

Unlike the automatic loaders of known type, the new loader has a low noise level since the pipes are not moved by gravity but perform a controlled translation movement.

Said pipes are also positioned in a compact manner inside the loader, since they are stacked in parallel rows. The loader therefore has limited overall dimensions and also the new drilling machine, as a whole, is extremely easy to handle.

Due to its compactness and low noise level, the new drilling machine can therefore be used also in limited spaces, such as small private gardens and in residential areas.

Furthermore, thanks to total automation of the drill pipe loading device, the present invention can be easily and effectively maneuvered by one single operator, with consequent reduction in labour costs.

The new invention can perform both vertical and slanting drilling operations, since it can operate with the mast slanting with respect to the vertical position.

The special loading system, furthermore, operates also with the mast slanting, since the mobile mechanical arms are integral with said mast.

The characteristics of the drilling machine with new drill pipe loader will be highlighted in greater detail in the following description, with reference to the drawings attached by way of non-limiting example.

In FIGS. 1a, 1b and 1c the new drilling machine is shown in a lateral view, in the non-operating (1) and operating (2) and (3) positions, respectively.

Figure 1C:
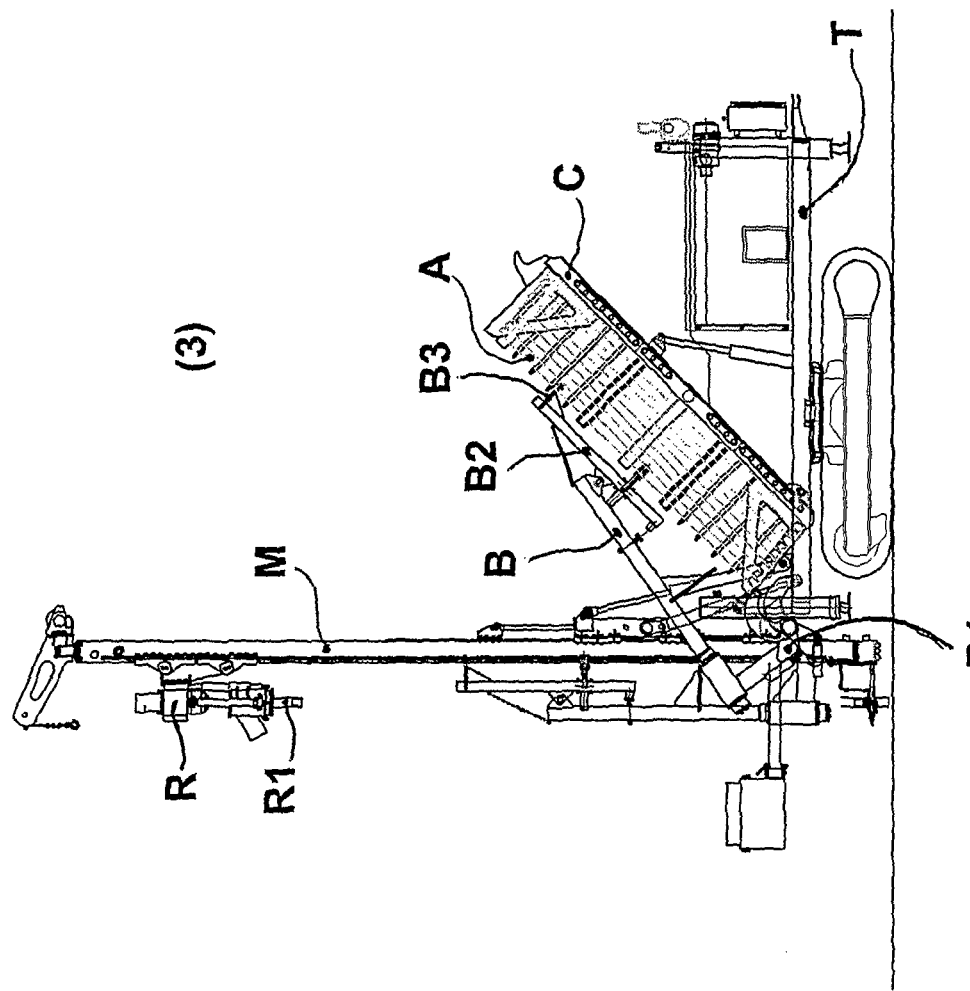
Figure 1A:
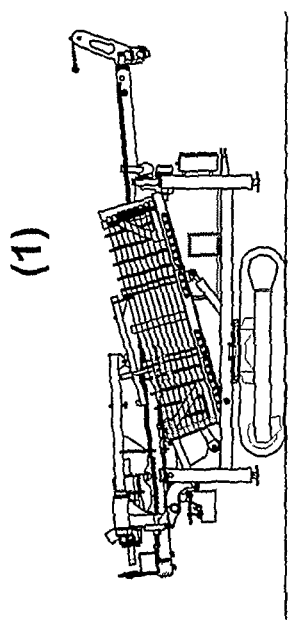
Figure 1B:
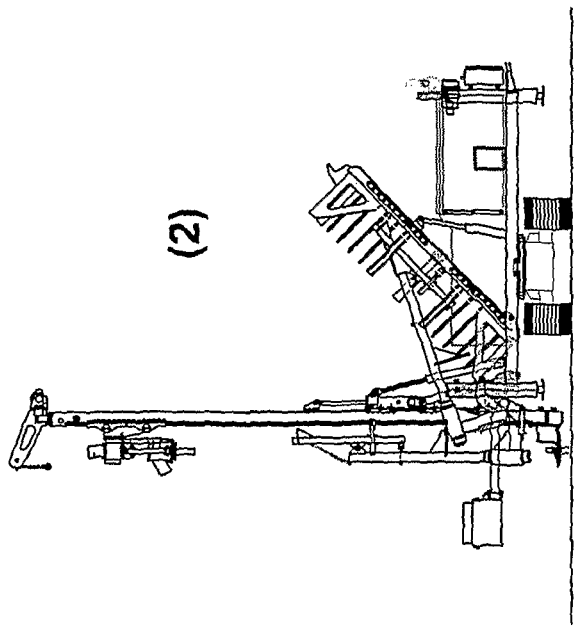
Figure 2A:
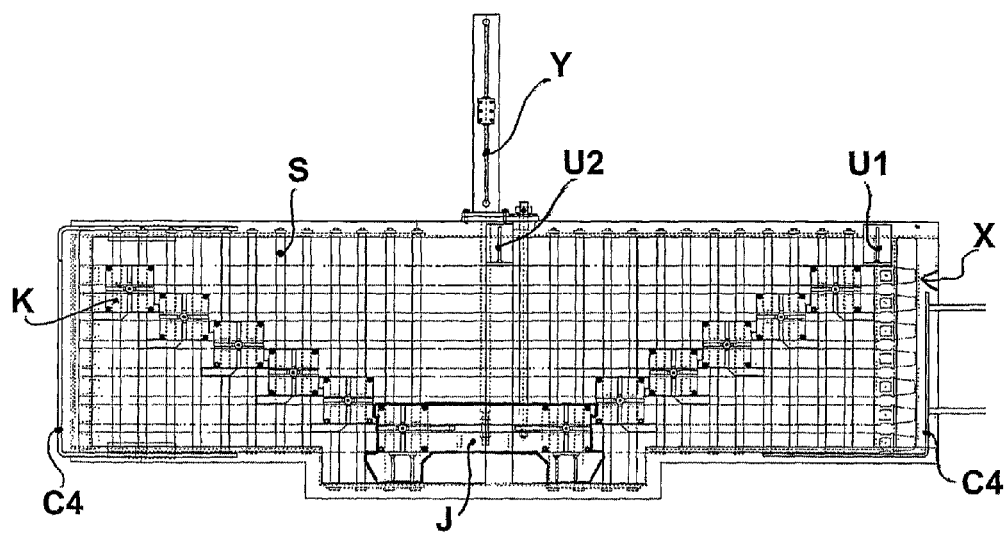
FIG. 2a shows a plan view of the new automatic drill pipe loader, while FIGS. 2b and 2c respectively show a perspective view and a lateral view of the new loader.
Figure 2B:
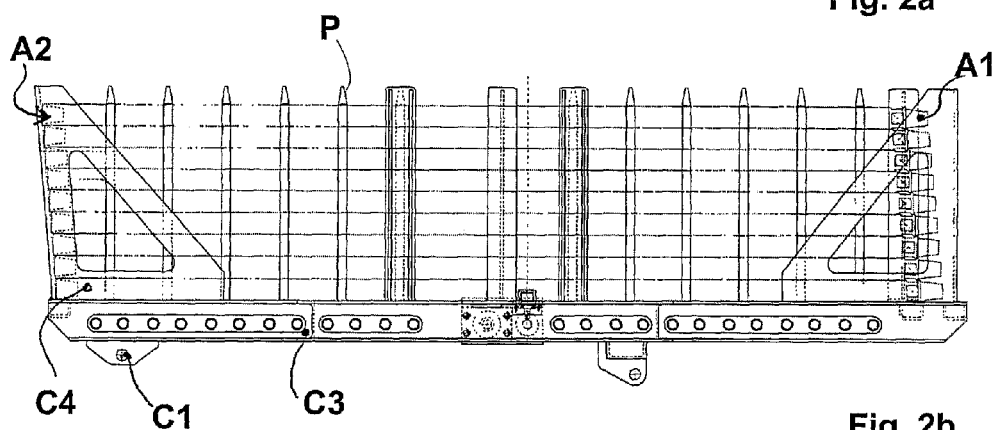
Figure 2C:
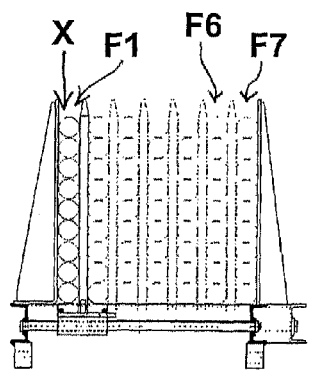

The new drilling machine substantially comprises a machine body with supporting frame (T) for the automatic loader (C) and at least one mast (M) provided with one or more rotating drill heads (R) for fitting, alignment and rotation of the drill column.

In particular, said rotating drill head (R) runs along said mast (M) and comprises one or more spindles or fittings (R1) for the upper end of the drill column.

Said drill column, analogously to the known drill columns, consists substantially of various segments, hereinafter simply called pipes (A), which are screw-connected to one another.

For said purpose, each of said pipes (A) preferably comprises one end (A1) threaded externally and the opposite end (A2) threaded internally.

Said pipes (A) are hollow tubular elements.

Said loader (C) comprises a lower supporting base (C3) and one or more lateral containment walls (C4).

Said loader is hinged (C1) to said supporting frame (T) integral with the machine body in a substantially horizontal position, i.e. said lower supporting base (C3) is arranged horizontally or slightly slanting with respect to the ground.

Said pipes (A) are placed inside said loader (C) parallel to said lower supporting base (C3).

Said loader (C) preferably has a substantially rectangular form, with longitudinal dimensions comparable to the length of said pipes (A) and transverse dimensions sufficient to contain 5-10 pipes (A) positioned side by side and parallel to one another.

Said pipes (A) are therefore arranged inside said loader (C) parallel and side by side.

Said lower supporting base (C3) comprises a plurality of parallel guides (S) arranged transversally with respect to the longitudinal dimensions of the loader (C), i.e. square to the pipes (A) inside it.

One, two or more long pins or bars (P) square to said lower supporting base (C3) are positioned between two adjacent pipes (A).

Each of said bars (P) is integral with a slider (J, K), i.e. an element running on said guides (S), and wherein preferably one single slider (J, K) runs on each of said guides (S).

In particular, each slider (J, K) runs preferably on at least two of said guides (S).

Substantially, said bars (P) are arranged so as to form parallel sectors, each of which has longitudinal dimensions equal to the length of the pipe (A) and transverse dimensions equal to the external diameter of the pipe (A).

Said pipes (A), which rest on said sliders (J, K), are inserted in said sectors, where they are overlapped parallel to one another to form a battery (F1, F2, . . . ).

A number of batteries (F1, F2, . . . ) equal to the number of sectors formed by said bars (P) is therefore arranged inside said loader (C), wherein each battery (F1, F2, . . . ) consists of 8-10 pipes (A).

When the new drilling machine is in the non-operating position (1), the loader (C) is arranged with the lower supporting base (C3) substantially parallel to the ground or slightly slanting, with all said pipes (A) positioned tidily inside it.

The loader (C) can be slanted, i.e. it is connected to one or more pistons or lifting devices (C2) which cause rotation of the loader (C) around the hinge (C1) providing connection to the supporting frame (T).

In the operating position (2), said loader (C) is further slanted until said lower supporting base (C3) has an angle of 30°-40° with respect to ground level.

The present invention furthermore comprises a system of mobile mechanical arms (B) having the function of withdrawing from the loader (C), which is in the operating position (2), the pipe (A) to be connected to the rotating drill head (R) to perform the drilling.

The mechanical arm (B) performs automated programmed movements suitable for reaching a pre-set withdrawal position (X) in the loader (C), gripping the pipe (A) which is in said withdrawal position (X) and positioning it below said drill head (R), wherein the upper end (A1) of said pipe (A) is screw-connected to the spindle or threaded fitting (R1) of the drill head (R).

Said withdrawal position (X) coincides for example with the first sector of the loader, in which the pipes (A) of the first battery (F1) are positioned.

The pipes (A) which are in the withdrawal position (X) are retained on one side by one or more of said bars (P), and on the opposite side, near the edge of the loader (C), by one or more limit stops (U1, U2) fixed to and integral with the lower supporting base (C3) and/or said lateral containment walls (C4).

In particular, the system of mechanical arms comprises at least one arm (B), hinged (B1) to the machine body and/or to the mast (M) and suitable for performing a rotary movement in the vertical plane, moving from a position substantially parallel to the mast (M) to a position slanting towards said loader (C).

A further small arm (B2) provided with jaws (B3) for gripping the pipe (A) is preferably hinged to said arm (B).

Said arm (B) rotates until the jaws (B3) of the small arm (B2) reach the first pipe (A) of the battery (F1) which is in the withdrawal position (X).

After said jaws (B3) have gripped said pipe (A), the arm (B) rotates and returns to the position parallel to said mast (M), which is positioned square to or slanting with respect to the ground, and rotates square to the mast (M) until it aligns the pipe (A) with said drill head (R).

Said fitting or spindle (R1) couples to the end (A1) of the pipe (A), while the drilling tool is fixed at the opposite end (A2).

At this point, said drill head (R) gives the pipe (A) a rotation-translation movement towards the ground in order to perform the drilling.

When said pipe (A) is inserted in the ground so that only said upper end (A1) protrudes therefrom, drilling is interrupted and the spindle or fitting (R1) detaches from the pipe (A) and moves back up the mast (M) to position (3) (FIG. 1c).

The mechanical arm (B) performs a further rotation towards said loader (C) until said jaws (B3) of the small arm (B2) reach the second pipe (A) of the battery (F1) which is in the withdrawal position (X) and from which it is withdrawn for subsequent use.

The operation described is repeated in the same way until the last pipe (A) of the battery (F1) is withdrawn, i.e. the pipe (A) resting on the lower supporting base (C3).

When all the pipes (A) of the first battery (F1) have been withdrawn for use, the new loader (C) automatically provides for translation of the other batteries (F2, F3, . . . ) towards said withdrawal position (X).

To perform the translation, the new loader (C) comprises a translation device (Y), acting on the main slider (J), i.e. on the slider farthest from the withdrawal position (X).

Said translation device (Y) has the function of translating said main slider (J), which runs on said guides (S), in a direction square to the pipes (A).

Said main slider (J) and said sliders (K) each comprise one, two or more lateral teeth and/or lugs (J1, J2), (K1, K2, K3), suitable for limiting the relative sliding between adjacent sliders (J, K).

In practice, the translation of one of said sliders (J, K) also causes the translation of the adjacent slider(s) (K).

Figure 4:
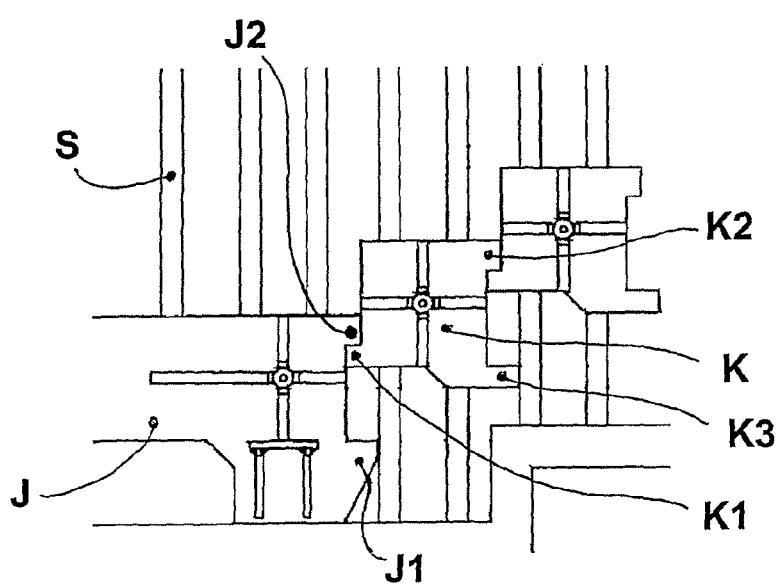
FIG. 4 shows a detail of the new loader.

For example, as shown in FIG. 4, translation of the main slider (J) causes translation of the slider immediately adjacent (K) thanks to the respective teeth (J2) and (K1).

Analogously, the translation of a slider (K) causes the translation of the slider adjacent to it (K) thanks to the respective teeth (K2) and (K1).

Consequently, the translation of said main slider (J) causes the translation of all the sliders (K) and, therefore, of all the pipes (A) contained in the loader (C) in a direction square to the pipes (A) and towards the withdrawal position (X).

In this way, the second battery (F2) is set to said withdrawal position (X), from which said mechanical arm (B) can withdraw the relative pipes (A).

When all the pipes (A) of the second battery (F2) have been withdrawn for use, said translation device (Y) causes a further translation of the main slider (J) by another step, so that the third battery (F3) is set to the withdrawal position (X).

Figure 3:
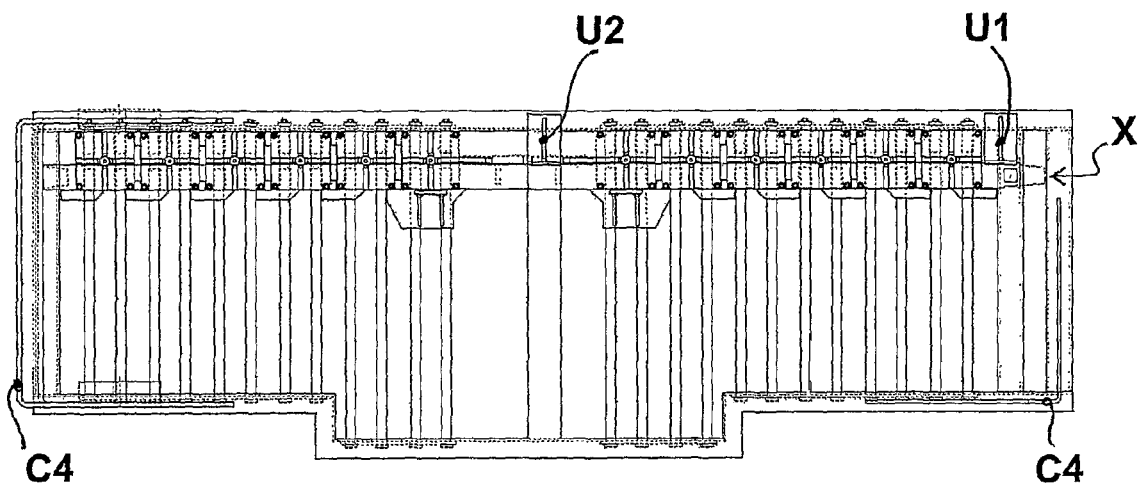
FIG. 3 shows the new loader completely closed, i.e. without any drill pipe inside.

As said pipes are used, the sliders (K) are aligned with the limit stops (U1, U2) until, as shown in FIG. 3, when the last battery (F7) is in the withdrawal position (X), all the sliders (K) and the main slider (J) are aligned.

When all the pipes (A) are used, the withdrawal position (X) is empty.

At the end of drilling, the new drilling machine proceeds with extraction of the drill pipes (A) from the ground.

The extraction operation is performed by means of said drill head (R) which raises the drill pipe and unscrews the last segment of it, which is gripped by the jaws (B3) of the small arm (B2) of the mechanical arm (B).

Said mechanical arm (B) rotates horizontally and vertically so as to reposition the pipe (A) in the loader (C), in the withdrawal position (X).

The operation is repeated until the battery (F7) is complete, then the translation device (Y) translates the main slider (J), moving it one step away from the withdrawal position (X) in a direction square to the pipes (A).

In this way, also the battery (F7) is moved by one step and the withdrawal position (X) is empty again, ready for insertion of the next pipes (A).

When all the pipes (A) making up the next battery (F6) have been positioned, said translation device (Y) translates said main slider (J) by one more step.

The translation of said main slider (J) also causes translation of the adjacent slider(s) (K), i.e. causes translation of the relative pipes (A) resting on them. In this way the complete battery (F6) is translated, and the withdrawal position (X) is empty, ready for insertion of the next pipes (A).

The operation is repeated identically until all the pipes (A) have been extracted from the ground and placed correctly in the loader (C).

Therefore, with reference to the above description and the accompanying drawings, the following claims are made.

The invention claimed is:

1. A drilling machine comprising:
    a machine body with a supporting mast having a drill head;
    a drill pipe rotatable and translatable in relation to the machine body;
    a loader configured to carry a plurality of drill pipes;
    a supporting frame hinged to the loader and integral with the machine body,
    wherein the loader is disposed at an angle which is variable with respect to the ground by rotating the loader around one or more hinges, and
    wherein the loader comprises a plurality of sliders running on parallel guides, the plurality of sliders being configured to support the plurality of drill pipes in positions parallel to one another and transversally to the parallel guides, and
    one or more pins or bars perpendicular to the parallel guides and transverse to and integral with at least one of said sliders, the one or more pins or bars being disposed between adjacent pipes, wherein the sliders are disposed to run on said parallel guides, thereby causing translation of said pins or bars and of said plurality of drill pipes positioned between said pins or bars.

2. The drilling machine according to claim 1, wherein each of the plurality of sliders comprises one or more lateral teeth or lugs such that a translation of a first slider causes a translation of a second slider disposed adjacently to the first slider, and such that the translation of the second slider causes the translation of the first slider.

3. The drilling machine according to claim 1, further comprising a translation device for a first slider, wherein the translation device causes a second, adjacent slider to translate upon a translation of the first slider.

4. The drilling machine according to claim 1, further comprising a mobile mechanical arm configured to withdraw at least some of the plurality of drill pipes from a pre-set withdrawal position inside the loader and to position the at least some of the plurality of drill pipes at a level of a spindle or threaded fitting of said drill head.

5. The drilling machine according to claim 4, wherein one or more of the plurality of sliders are configured to run on said guides and to position the at least some of said plurality of drill pipes in said withdrawal position.

6. The drilling machine according to claim 4, wherein to permit re-positioning of the drill pipes extracted from the ground in said withdrawal position in the loader, one or more of said plurality of sliders run on said guides, thereby causing the drill pipes extracted from the ground to translate and move away from the withdrawal position.

7. The drilling machine of claim 1, wherein each of the sliders runs on two or more guides.

* * * * *